Aug. 18, 1964   E. F. GROH   3,145,151
FUEL ASSEMBLY FOR LOW POWER REACTORS
Filed May 14, 1963   2 Sheets-Sheet 1
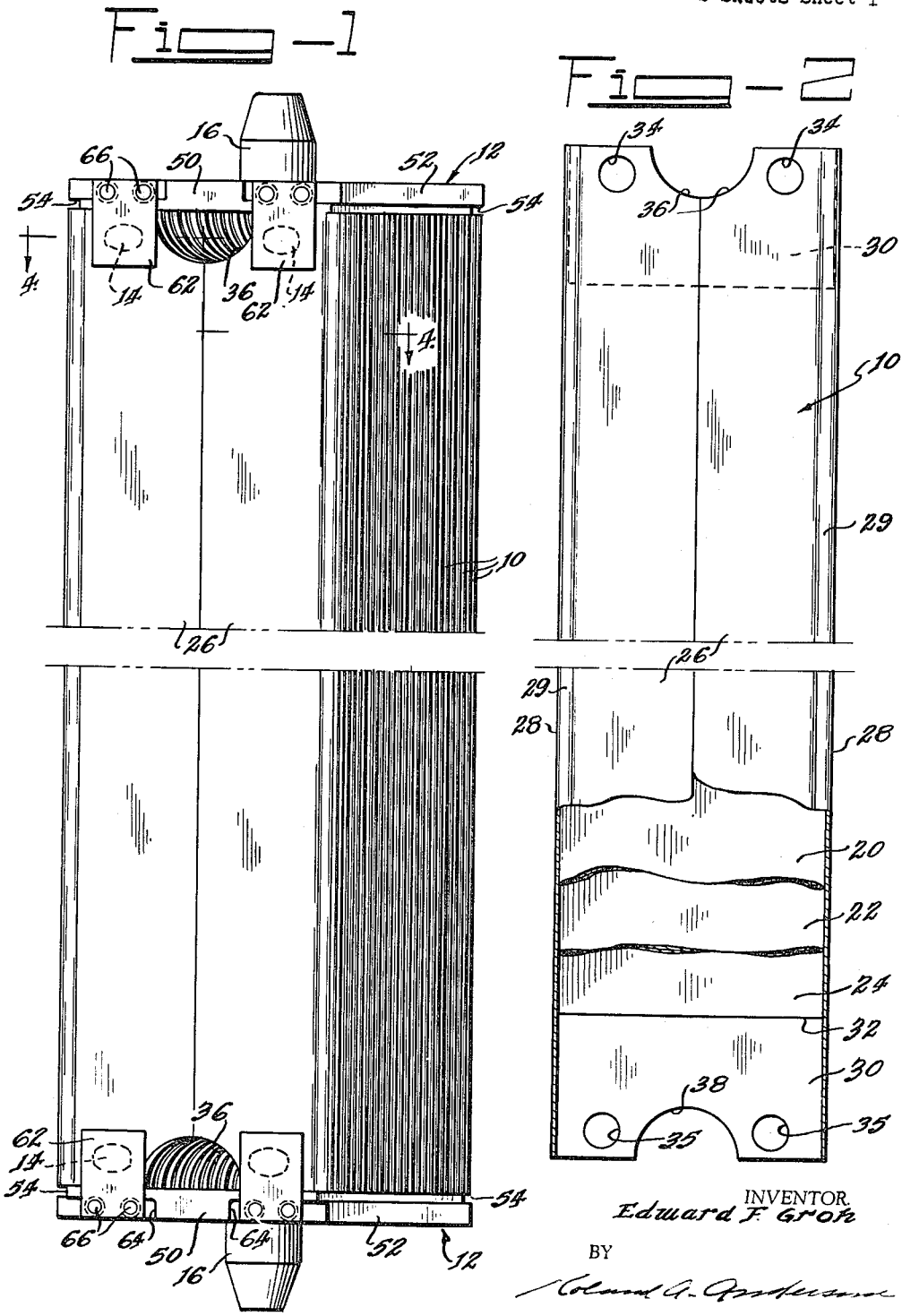
INVENTOR.
Edward F. Groh
BY
Roland G. Anderson
Attorney Aug. 18, 1964   E. F. GROH   3,145,151
FUEL ASSEMBLY FOR LOW POWER REACTORS
Filed May 14, 1963   2 Sheets-Sheet 2
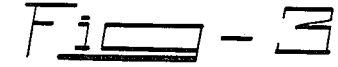
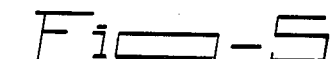
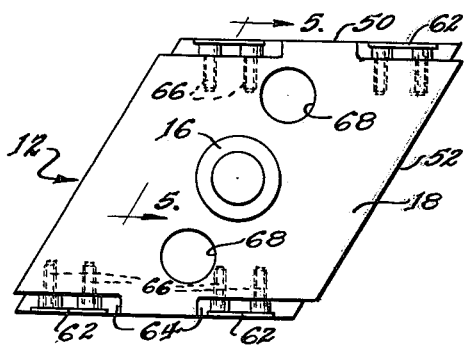
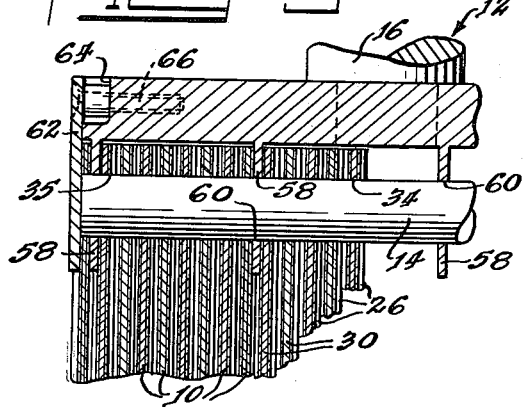
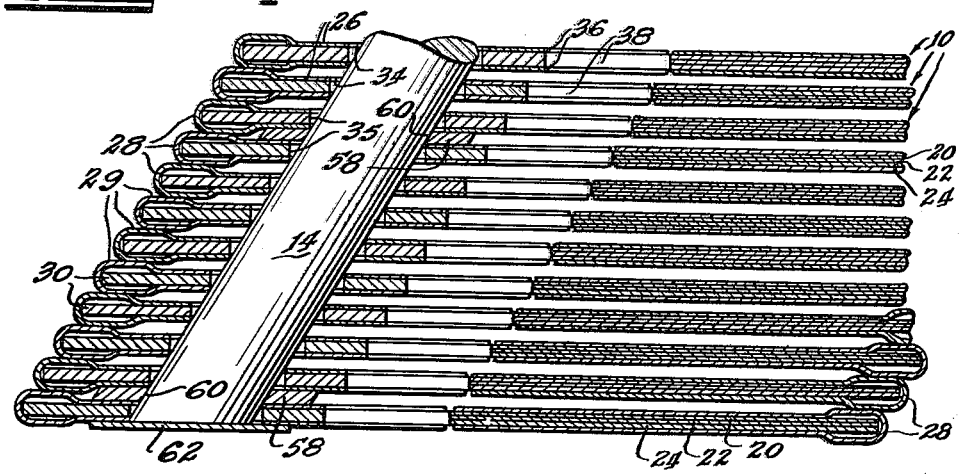
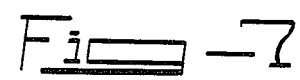
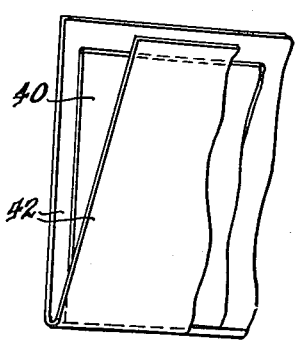
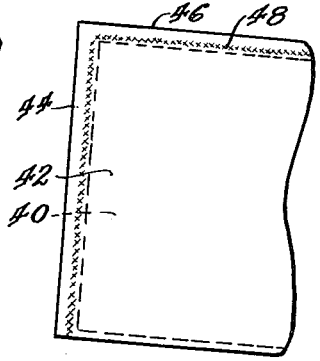
INVENTOR.
Edward F. Groh
BY
Roland A. Anderson
Attorney ло
United States Patent Office 3,145,151
Patented Aug. 18, 1964

3,145,151
FUEL ASSEMBLY FOR LOW POWER REACTORS
Edward F. Groh, Naperville, Ill., assignor to the United
States of America as represented by the United States
Atomic Energy Commission
Filed May 14, 1963, Ser. No. 280,476
8 Claims. (Cl. 176—75)

This invention relates to a fuel assembly for use in low power reactors.

Many reactors are being built for the purpose of studying or demonstrating the effects of various fuels and poisons on reactor characteristics. In such reactors it is frequently desirable to revise and change the components of the reactor core. Such reactors are usually referred to as critical assemblies, or zero power reactors. These generally require no heat exchange equipment since the power generation is limited to a few watts. The limited power makes it possible for personnel to work with reactor core components shortly after shutting down the reactor without excessive exposure to radioactivity.

While a number of fuel assemblies have been designed for use in critical assemblies, these fuel assemblies usually are fabricated and assembled without provision for subsequent alteration. Alterations, if made, generally require the use of skilled labor for welding, machining, and the like. Moreover, the fabrication of fuel assemblies usually requires specialized equipment and the services of well-trained highly skilled labor which normally are not available in small shops.

Fuel assemblies made according to the present invention largely overcome these disadvantages by providing a type of construction which may be economically fabricated, assembled and disassembled by relatively unskilled labor. Furthermore, these fuel plate assemblies are composed of a number of fuel plate assemblies each of which may be altered to contain any combination of one or several fuel plates, poison plates, or plates of other test materials.

Other advantages of the present invention will be apparent from the description and from the drawings in which:

FIG. 1 is an elevation of a fuel assembly according to the present invention.

FIG. 2 is an elevation of a fuel plate assembly.

FIG. 3 is a top view of the fuel assembly shown in FIG. 1.

FIG. 4 is an enlarged fragmentary section taken on line 4—4 of FIG. 1.

FIG. 5 is an enlarged section taken on line 5—5 of FIG. 3.

FIG. 6 is a diagrammatic view showing a step in the fabrication of a single fuel plate.

FIG. 7 is a diagrammatic view similar to FIG. 6 showing a partially completed fuel plate.

The fuel assembly as shown in FIG. 1 has a plurality of fuel plate assemblies 10 secured to end fittings 12 by anchor pins 14 shown also in FIGS. 4 and 5. Each end fitting 12 has a locator pin 16 centered on an end surface 18 as shown in FIG. 3. The locator pin 16 is used to accurately position the fuel assembly in relationship to other fuel assemblies and control rods in a critical assembly.

A typical fuel plate assembly 10 as shown in FIG. 2 is composed of three plates 20, 22, and 24 sheathed in a pair of plate clips 26. Each plate clip 26 is a longitudinally folded strip of metal, preferably stainless steel, having a folded edge 28 enlarged as shown in FIG. 4 so that the enlarged portion 29 spaces adjacent fuel plate assemblies 10 apart. This allows space for a moderator such as water to be used in these fuel assemblies. An end insert 30 is positioned against the ends 32 of plates 20, 22, and 24 within the ends of the clips 26. The end insert 30 is equal in thickness to the combined thickness of the plates 20, 22, and 24. The clips 26 and the end inserts 30 have anchor pin holes 34 and 35 respectively in registry. The clips 26 have cut-away inner corners 36 in registry with cut-away portions 38 in the end inserts 30. This provides access for the moderator to reach all fuel plate assemblies 10 in the fuel assembly shown in FIG. 1.

The plates 20, 22, and 24 shown in FIG. 2 may be in any combination of plates containing fuel, poison, or "dummy" material such as stainless steel. The poison may be 1–2% boron dispersed in stainless steel.

Plates containing fuel may be constructed as shown in FIGS. 6 and 7 in which a fuel foil 40 is enclosed in a folded jacket foil 42 of stainless steel. The jacket foil 42 may be sealed on nonfolded edges 44 and 46 by a welded seam 48 as shown in FIG. 7. This jacketed type of fuel plate may be trimmed along the outer edge of the welded seam 48. When desired, the fuel foil may be reclaimed by shearing the jacket foil 42 along the inner edge of the welded seam 48, and removing the fuel foil 40 intact. The fuel foil 40 may be of any desired fissionable material or combination of materials.

A number of fuel plate assemblies 10 have been fabricated according to the present invention for use in a critical assembly preparatory to determining design characteristics for the proposed Argonne Advanced Research Reactor. This critical assembly contains forty-five fuel assemblies such as shown in FIG. 1, each of which contains twenty-seven fuel plate assemblies 10. Each of the latter contains three plates 20, 22, and 24, one of which will contain a fuel foil 40, and two of which will be of stainless steel having 1% boron dispersed therewith. Each plate 20, 22, and 24 is ten thousandths of an inch in thickness. The clips 26 were made from stainless steel sheet five thousandths of an inch thick. The exact compositions of components are not a part of this invention and do not limit the scope thereof. This invention may be applied to a number of combinations of materials limited only by the design requirements of a particular critical assembly.

The end fitting 12 as shown in FIG. 3 is a 60° parallelogram having side edge 50 and end edge 52 approximately equal in length and meeting to form an included angle of sixty degrees. It should be noted that this invention is not limited to this particular shape. The fuel plate assemblies 10 are assembled on the end fitting 12 parallel to the side edge 50 which is sufficiently longer than the width of the fuel plate assemblies 10 to extend at least to the outermost portion of the fuel plate assemblies 10 as shown in FIG. 1. In order to provide free access for the moderator to enter into the enlarged portions 29 of the clips 26, each end edge 52 has been provided with an access groove 54 as shown in FIG. 1.

In order to assure positive spacing between adjacent fuel plate assemblies 10 with the end fitting 12, each clip 26 is shaped to have a flat, enlarged portion 29 extending from the folded edge 28 inward for a distance at least equal to the thickness of the enlarged portion 29. This spaces one fuel plate assembly 10 from the next even though there is a step-wise relative position of adjacent fuel plate assemblies 10 as shown in FIG. 4. The enlarged portion 29 has an additional function as a stiffener for the fuel plate assembly 10.

The end fitting 12 as shown in FIG. 5 has a plurality of anchor tabs 58, each of which extends between a pair of adjacent fuel plate assemblies 10 with an anchor pin hole 60 in registry with the anchor pin holes 34 and 35 in the fuel plate assemblies 10. Anchor pins 14 inserted in the registered anchor pin holes lock the end fitting 12 to the fuel plate assemblies 10. In this particular embodiment there are four anchor tabs 58 for each anchor pin 14.

As shown in FIGS. 3 and 5, the anchor pins 14 are retained by fasteners 62 which are secured to the end fittings 12 in recesses 64 in the side edges 50 so that the fasteners 62 are flush with the side edges 50. The fasteners 62 extend over the ends of the anchor pins 14 and over a portion of the outer surface of the outermost fuel plate assembly 10 in a retaining relationship thereto. The fasteners 62 are secured to the end fittings 12 by screws 66.

In this particular embodiment, as shown in FIG. 4, each anchor pin 14 passes obliquely through the anchor pin holes 34 and 35 in each of the fuel plate assemblies 10 due to the 60° parallelogram shape of the end fitting 12. Instead of incurring the expense of machining parts with oval holes, or using anchor pins 14 with oval cross sections, the anchor pin holes 34 and 35 in the fuel plate assemblies 10 are drilled slightly oversize so as to allow oblique insertion of the anchor pins 14. The end fittings 12 may be machined from inexpensive extruded aluminum stock which may be drilled along the line of insertion for the anchor pin holes 60 prior to machining away the metal between anchor tabs 58. It is also possible to preform anchor pin holes 60 by including suitable holes in the aluminum stock as extruded. This eliminates any need for drilling oversize holes in the anchor tabs 58.

The end fittings 12 are provided with moderator access holes 68 as shown in FIG. 3 to assist in the distribution and drainage of moderator. This augments the lateral flow of moderator through the aligned cut-away inner corners 36 and the cut-away portions 38 as shown in FIG. 2 and in the fuel assembly in FIG. 1. No provision need be made for circulation of the moderator since in this embodiment the moderator temperature is not expected to exceed 170° F.

It will be understood that this invention is not limited to the features described herein, but may be modified within the scope of the appended claims.

The embodiments of the invention in which an exclusive property or privilege is claimed are defined as follows:

1. A fuel assembly for use in a nuclear reactor, comprising:
   (a) a plurality of fuel plate assemblies, each having enlarged side edge portions for spacing one fuel plate assembly from another and having ends with anchor holes therein;
   (b) a pair of end fittings having anchor tabs adapted to be positioned between adjacent fuel plate assemblies, said tabs having holes in registry with the anchor holes in the fuel plate assemblies;
   (c) a plurality of anchor pins each of which is inserted in a set of said registered holes thereby locking an end fitting to the ends of said fuel plate assemblies;
   (d) and means attached to said end fitting for retaining said anchor pins in place.

2. A fuel assembly for use in a nuclear reactor, comprising:
   (a) a plurality of fuel plate assemblies, each having enlarged side edge portions for spacing one fuel plate assembly from another and having ends with anchor holes therein;
   (b) a pair of end fittings each in the shape of oblique parallelograms and having anchor tabs adapted to be positioned between adjacent fuel plate assemblies, said tabs having holes in registry with the anchor holes in the fuel plate assemblies which are positioned to conform to the shape of the end fitting;
   (c) a plurality of anchor pins each of which is inserted in a set of said registered holes thereby locking an end fitting to the ends of said fuel plate assemblies;
   (d) and a plurality of anchor pin fasteners attached to said end fittings, said fasteners positioned over ends of said anchor pins.

3. A fuel assembly for use in a nuclear reactor, comprising:
   (a) a plurality of fuel plate assemblies, each of said assemblies including at least one fuel plate, a pair of longitudinally folded plate clips positioned over the side edges of the fuel plate, said clips each having an enlarged folded edge for spacing one plate assembly from another and having ends with anchor holes;
   (b) a pair of end fittings having anchor tabs adapted to be positioned between fuel plate assemblies, said tabs having holes in registry with the anchor holes in the clips;
   (c) a plurality of anchor pins each inserted in a set of said registered holes thereby locking said end fittings to said fuel plate assemblies;
   (d) means attached to said end fittings for fastening said anchor pins in place;
   (e) and a locator pin centrally located on each end fitting for accurately positioning said assembled fuel plates in a reactor.

4. A fuel assembly for use in a nuclear reactor, comprising:
   (a) a plurality of thin plates, one of which may contain fissionable material and one of which may contain poison material, said plates being in a stacked relationship;
   (b) a pair of longitudinally folded plate clips positioned over opposite side edges of said stacked plates and having ends extending beyond the end edges of the plates, each of said clip ends having an anchor hole and a cut-away inner corner, each of said clips having a folded outer edge which is somewhat thicker than the combined thickness of the clip and the enclosed plates;
   (c) a plurality of end inserts positioned one in each end of said pair of plate clips, each of said inserts having a pair of anchor holes in registry with the anchor holes in the ends of the clips and having a cut-away portion in registry with the cut-away inner corners of the clips, said inserts being in contact with the end edges of the stacked plates, said inserts together with said clips and said plates forming a completed fuel plate assembly;
   (d) a plurality of said fuel plate assemblies arranged in a side by side, stacked relationship, said assemblies being spaced apart by the folded edges of the clips;
   (e) a pair of end fittings secured one to each end of the fuel plate assemblies, each end fitting having a plurality of anchor tabs, said tabs being positioned for insertion between adjacent pairs of fuel plate assemblies, said tabs each having an anchor hole in registry with the anchor holes in said clips, said end fittings each having a plurality of openings to permit a moderator to fill void spaces in the fuel plate assemblies;
   (f) a plurality of anchor pins, one pin passing through each set of anchor holes in registry thereby locking said end fittings to the fuel plate assemblies;
   (g) a plurality of anchor pin fasteners, one positioned over each end of each anchor pin, said fasteners being secured to a side edge of the end fitting;
   (h) and a locator pin centrally attached to an end surface of each end fitting whereby completed fuel assemblies may be accurately positioned in a reactor.

5. A fuel assembly according to claim 4 in which the number of plates in each fuel plate assembly is limited to three, each of which is about ten thousandths of an inch in thickness.

6. A fuel assembly according to claim 5 in which one plate is a fuel plate which contains fissionable material and at least one other plate includes poison material.

7. A fuel assembly according to claim 6 in which the fuel plate is a foil of fissionable material sealed between jacket foils of stainless steel and the remaining two plates are each of stainless steel having 1% boron dispersed therein.

8. A fuel assembly according to claim 7 in which the end fittings each have one side edge and one end edge meeting with an included angle of 60°, said side edge being somewhat longer than the width of a fuel plate assembly, said end edge having an access groove adjacent the folded edges of the plate clips to allow void spaces about said folded edges to be filled with moderator; and said plate clips each having an enlarged portion of uniform thickness extending from the folded edges inward for a distance equal to at least the thickness of the enlarged portion, thereby providing uniform spacing between adjacent fuel plate assemblies.

References Cited in the file of this patent

UNITED STATES PATENTS

| | | |
|---|---|---|
| 2,954,335 | Wigner | Sept. 27, 1960 |
| 2,981,673 | Johnson | Apr. 25, 1961 |
| 2,989,456 | Jessen | June 20, 1961 |
| 3,029,198 | Anderson et al. | Apr. 10, 1962 |
| 3,086,935 | Groh et al. | Apr. 23, 1963 |
| 3,105,807 | Blake | Oct. 1, 1963 |
| 3,124,515 | Neal | Mar. 10, 1964 |

FOREIGN PATENTS

| | | |
|---|---|---|
| 768,078 | Great Britain | Feb. 13, 1957 |

OTHER REFERENCES

GNEC–136, A 200-mw. (e.) Boiler-Superheater Reactor Preliminary Design, Oct. 24, 1960, p. 30 and FIG. 4.